(12) United States Patent
Ota et al.

(10) Patent No.: US 8,497,995 B2
(45) Date of Patent: Jul. 30, 2013

(54) MEASUREMENT APPARATUS AND METHOD FOR MEASURING SURFACE SHAPE AND ROUGHNESS

(75) Inventors: Kazuyuki Ota, Yokohama (JP); Hiroshi Yoshikawa, Kawasaki (JP); Yusuke Mitarai, Tokyo (JP); Masafumi Takimoto, Kawasaki (JP); Kazunori Okudomi, Kawasaki (JP); Hiroyuki Shinbata, Tama (JP); Kenji Saitoh, Atsugi (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 12/669,825

(22) PCT Filed: Aug. 14, 2008

(86) PCT No.: PCT/JP2008/064859
§ 371 (c)(1),
(2), (4) Date: Jan. 20, 2010

(87) PCT Pub. No.: WO2009/028377
PCT Pub. Date: Mar. 5, 2009

(65) Prior Publication Data
US 2010/0220338 A1    Sep. 2, 2010

(30) Foreign Application Priority Data
Aug. 24, 2007  (JP) .................................. 2007-218382

(51) Int. Cl.
*G01B 11/24*   (2006.01)
(52) U.S. Cl.
USPC ........................................................ 356/601

(58) Field of Classification Search
USPC ............ 356/600–625, 237.1–237.5; 250/225, 250/239, 339.02, 216; 348/355, 254, 349, 348/356
See application file for complete search history.

(56) References Cited

U.S. PATENT DOCUMENTS

| | | | | |
|---|---|---|---|---|
| 4,792,696 A | * | 12/1988 | Kender et al. | ............ 250/559.22 |
| 4,967,280 A | * | 10/1990 | Takuma et al. | ................ 348/355 |
| 5,946,029 A | * | 8/1999 | Yoshimura et al. | ........... 348/131 |

(Continued)

FOREIGN PATENT DOCUMENTS

| | | |
|---|---|---|
| CN | 1696672 A | 11/2005 |
| EP | 0 580 909 | 2/1994 |

(Continued)

OTHER PUBLICATIONS

Chinese Office Action dated Jun. 24, 2011, in related Chinese Patent Application No. 200880104252.1 (with English translation).

(Continued)

*Primary Examiner* — Sang Nguyen
(74) *Attorney, Agent, or Firm* — Fitzpatrick, Cella, Harper & Scinto

(57) ABSTRACT

A measurement apparatus includes an illumination light setting unit which sets illumination light having an optical characteristic corresponding to a microstructure which is formed on the surface of a measurement target and is to be measured, and a measurement unit which measures reflected light when the measurement target is irradiated with the illumination light. In addition, an extraction unit extracts, from the measured reflected light, information about the surface shape of the measurement target and the microstructure formed on the surface.

9 Claims, 18 Drawing Sheets

U.S. PATENT DOCUMENTS

| | | | |
|---|---|---|---|
| 6,177,682 B1 * | 1/2001 | Bartulovic et al. | 250/559.44 |
| 6,577,404 B2 * | 6/2003 | Max et al. | 356/601 |
| 7,262,856 B2 * | 8/2007 | Hobbs et al. | 356/436 |
| 7,312,879 B2 * | 12/2007 | Johnston | 356/614 |
| 7,313,506 B2 * | 12/2007 | Kacyra et al. | 703/6 |
| 7,321,433 B2 * | 1/2008 | Larsen et al. | 356/601 |
| 2002/0093664 A1 | 7/2002 | Max et al. | |
| 2005/0247895 A1 | 11/2005 | Ando et al. | |

FOREIGN PATENT DOCUMENTS

| | | |
|---|---|---|
| JP | 06-201353 A | 7/1994 |
| JP | 10-221038 A | 8/1998 |
| JP | 2003-107009 A | 4/2003 |
| JP | 2006-058160 A | 3/2006 |
| JP | 2006-275955 | 10/2006 |
| KR | 10-2003-0061644 A | 7/2003 |
| WO | WO 01/81859 | 11/2001 |
| WO | 03/060425 A1 | 1/2003 |
| WO | WO 2007/030026 | 3/2007 |
| WO | 2007/069457 A1 | 6/2007 |

OTHER PUBLICATIONS

Chinese Office Action dated Jan. 20, 2011, in related corresponding Chinese Patent Application No. 200880104252.1 (with English translation).

Korean Office Action dated Aug. 6, 2011, in corresponding Korean Patent Application No. 10-2010-7005762.

P. Tomassini, et al., "Novel Optical Sensor for the Measurement of Surface Texture", Review of Scientific Instruments, vol. 72, No. 4, pp. 2207-2213 (Apr. 2001).

International Search Report and Written Opinion dated Dec. 22, 2008, in related corresponding PCT Japanese Patent Appln. No. PCT/JP2008/064859.

Chinese Office Action dated Feb. 21, 2012, in related Chinese Patent Application No. 200880104251.1.

Japanese Office Action dated May 8, 2012, in related Japanese Patent Application No. 2007-218382.

* cited by examiner

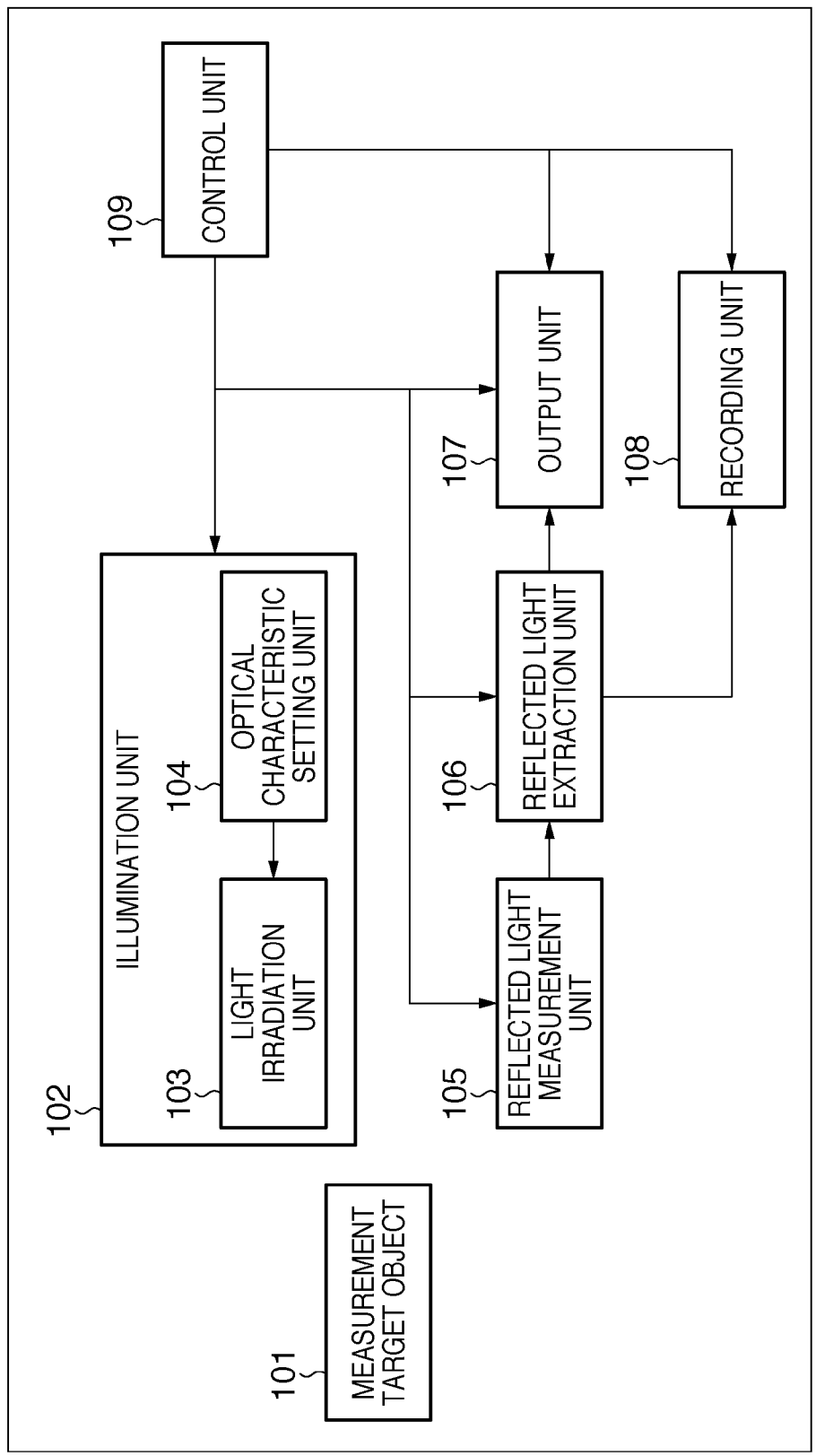

REFLECTED LIGHT ATTRIBUTED TO
GEOMETRIC-OPTICAL COMPONENT

REFLECTED LIGHT ATTRIBUTED TO
WAVE-OPTICAL COMPONENT

MEASUREMENT APPARATUS AND METHOD FOR MEASURING SURFACE SHAPE AND ROUGHNESS

TECHNICAL FIELD

The present invention relates to a measurement apparatus and method of measuring reflected light from the surface of an inspection target.

BACKGROUND ART

When a measurement target object is irradiated with illumination light, light reflected by the surface of the measurement target object sometimes contains scattered light. The scattered light scatters not in the regular reflection direction with respect to the incident angle of light but in various directions. The scattered light is generated by a microstructure of 760 nm or less formed on the surface of the measurement target object.

A BRDF apparatus measures scattered light. "BRDF" is a short for "Bi-directional Reflectance Distribution Function".

The BRDF is a function that returns the reflection angle of light using the incident angle or wavelength of light as an argument, and changes depending on the material or microstructure of a predetermined substance. The BRDF is mainly used to express the surface state or texture of a predetermined substance in virtual space.

Patent reference 1 discloses a BRDF measurement apparatus that supports multibands containing four or more color components.

[Patent Reference 1] Japanese Patent Laid-Open No. 2006-275955

A demand has recently grown for measuring not only the surface shape of a measurement target but also the microstructure formed on the surface of the measurement target. The conventional BRDF apparatus can measure the BRDF on the surface of a measurement target object but does not propose to measure the surface shape of a measurement target.

DISCLOSURE OF INVENTION

The present invention has been made in consideration of the above-described problem, and has as its object to extract information about the surface shape of an inspection target and a microstructure on the surface.

According to the first aspect of the present invention, there is provided a measurement apparatus comprising: an illumination light setting unit which sets illumination light having an optical characteristic corresponding to a microstructure which is formed on a surface of a measurement target and is to be measured; a measurement unit which measures reflected light when the measurement target is irradiated with the illumination light; and an extraction unit which extracts, from the measured reflected light, information about a surface shape of the measurement target and the microstructure formed on the surface.

According to the second aspect of the present invention, there is provided a measurement apparatus comprising: an illumination light setting unit which sets illumination light having a wavelength corresponding to a measurement request of a measurement target; a measurement unit which measures first reflected light when a relative position between the illumination light and the measurement target is a first relative position, and the measurement target is irradiated with the illumination light, and second reflected light when the relative position between the illumination light and the measurement target is a second relative position, and the measurement target is irradiated with the illumination light; and an extraction unit which extracts, from the measured first reflected light and second reflected light, information about a surface shape of the measurement target and a microstructure formed on the surface.

According to the third aspect of the present invention, there is provided a measurement method comprising: an illumination light setting step of causing an illumination light setting unit to set illumination light having an optical characteristic corresponding to a microstructure which is formed on a surface of a measurement target and is to be measured; a measurement step of causing a measurement unit to measure reflected light when the measurement target is irradiated with the illumination light; and an extraction step of causing an extraction unit to extract, from the measured reflected light, information about a surface shape of the measurement target and the microstructure formed on the surface.

According to the fourth aspect of the present invention, there is provided a program which causes a computer to function as: an illumination light setting unit which sets illumination light having an optical characteristic corresponding to a microstructure which is formed on a surface of a measurement target and is to be measured; a measurement unit which measures reflected light when the measurement target is irradiated with the illumination light; and an extraction unit which extracts, from the measured reflected light, information about a surface shape of the measurement target and the microstructure formed on the surface.

Further features of the present invention will become apparent from the following description of exemplary embodiments with reference to the attached drawings.

BRIEF DESCRIPTION OF DRAWINGS

FIG. 1 is a block diagram showing the arrangement of a measurement apparatus according to the first embodiment;

BEST MODE FOR CARRYING OUT THE INVENTION

The preferred embodiments of the present invention will now be described in detail with reference to the accompanying drawings.

(First Embodiment)

The first embodiment of the present invention will be described below with reference to the accompanying drawings.

FIG. 1 is a block diagram showing the arrangement of a measurement apparatus according to this embodiment.

A measurement target object 101 is a measurement target to be measured by the measurement apparatus of this embodiment.

The measurement target object 101 is, e.g., a charging roller to be arranged in a copying machine or the like, or a lens to be attached to a camera. These products may suffer low performance due to flaws on the surface and thus require surface measurements.

An illumination unit 102 illuminates the measurement target object 101.

A light irradiation unit 103 included in the illumination unit 102 irradiates the measurement target object 101 with light. The light irradiation unit 103 has, e.g., a light bulb, halogen lamp, or bulb-shaped electronic flash Xe tube.

An optical characteristic setting unit 104 sets the optical characteristics of illumination light to be emitted by the light irradiation unit 103. The optical characteristics are set based on a user's measurement request and a microstructure on the surface of the measurement target object 101. The optical characteristics correspond to the measurement accuracy necessary in measuring the measurement target object 101. In this embodiment, the optical characteristics include the wavelength of light, the polarization property of light, and the directionality of light. The relationship between the measurement accuracy of the measurement target object and the optical characteristics of illumination light will be explained.

The wavelength of light as one of the optical characteristics will be described first.

Figure 2A:
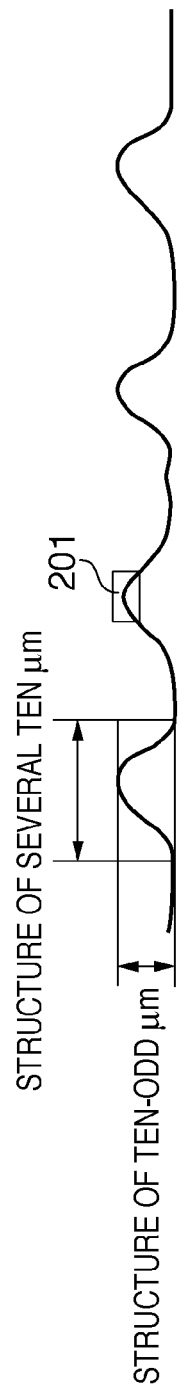
FIGS. 2A and 2B are views showing the surface structure of a measurement target object.
Figure 2B:
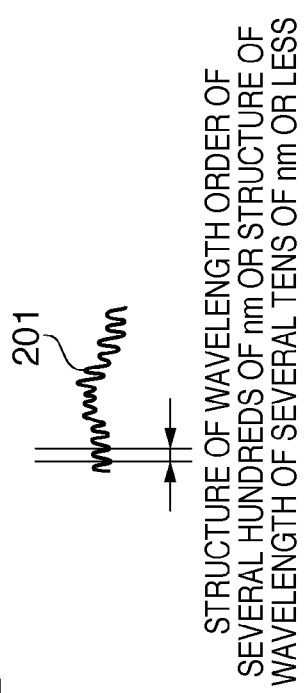

FIGS. 2A and 2B are views showing the surface structure of the measurement target object 101. FIG. 2A shows the surface structure of an inspection target which is of an order of magnitude larger than the wavelength of illumination light. As shown in FIG. 2A, the surface of an inspection target generally has a large three-dimensional pattern. The three-dimensional pattern shown in FIG. 2A ranges from ten-odd μm to several tens of μm. If the size of three-dimensional pattern of the reflection surface almost equals the wavelength of light, the property of the wavelength of reflected light is manifested so that scattered light is observed. However, since the wavelength of light is only several hundred nm, the three-dimensional pattern shown in FIG. 2A does not largely affect scattering of the reflected light.

FIG. 2B shows the surface structure of an inspection target which is of almost the same order of magnitude as the wavelength of illumination light. The three-dimensional pattern in FIG. 2B indicates an enlarged view of a portion 201 of the surface structure shown in FIG. 2A. The three-dimensional pattern shown in FIG. 2B corresponds to a microstructure of several hundred nm, which is almost equal to the wavelength of light. Hence, reflected light from the three-dimensional pattern shown in FIG. 2B is scattered light.

Figure 3A:
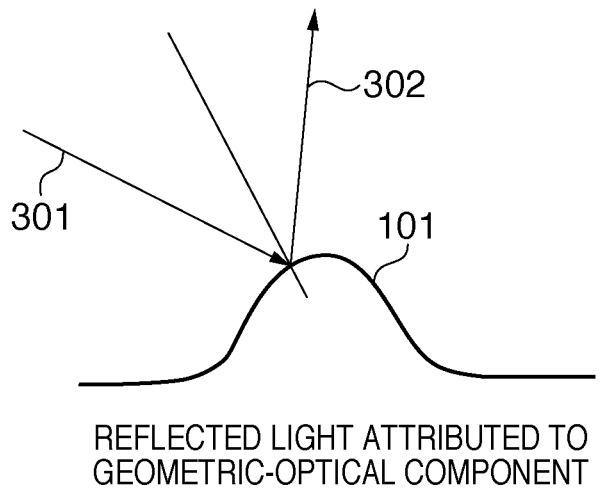
FIGS. 3A and 3B are views showing the relationship between the wavelength of illumination light and scattering of reflected light.
Figure 3B:
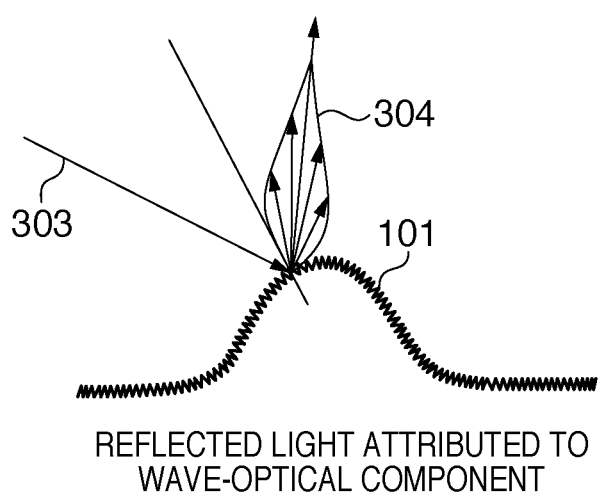

FIGS. 3A and 3B are views showing the relationship between the wavelength of illumination light and scattering of reflected light. FIG. 3A shows the geometric-optical component of reflected light. The geometric-optical component of reflected light indicates a reflected light component generated by a structure of ten-odd μm to several ten μm of the measurement target object 101. This is because the optical phenomenon on the measurement target object 101 can be explained by geometrical optics. As shown in FIG. 3A, the geometric-optical component of reflected light is regularly reflected.

FIG. 3B shows the wave-optical component of reflected light. The wave-optical component of reflected light indicates a reflected light component generated by a structure of several hundred nm of the measurement target object 101. This is because the optical phenomenon on the measurement target object 101 can be explained by wave optics. As shown in FIG. 3B, the wave-optical component of reflected light is attributed to a structure of several hundred nm of the measurement target object 101 and mainly reflected in directions other than the regular reflection direction.

As described above, the reflected light from the measurement target object 101 changes depending on the relationship between the wavelength of illumination light and the surface structure of the measurement target object 101. Hence, the optical characteristic setting unit 104 sets illumination light containing a wavelength corresponding to the measurement accuracy.

The polarization property of light of the optical characteristics will be described next. The polarization property of light indicates the regularity of light wave oscillation direction.

Figure 4:
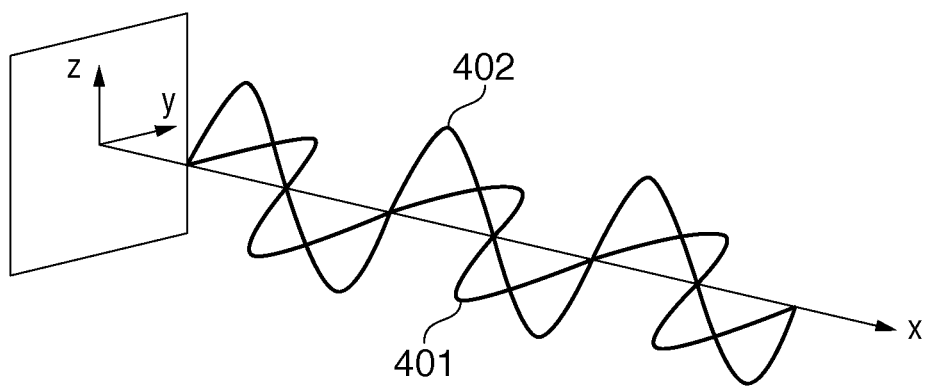
FIG. 4 is a view showing illumination light having two kinds of waves in different oscillation directions.

FIG. 4 is a view showing illumination light having two kinds of waves in different oscillation directions. The x-axis represents the direction of light irradiation.

An xy wave 401 is an illumination light wave which oscillates on the x-y plane shown in FIG. 4. An xz wave 402 is an illumination light wave which oscillates on the x-z plane shown in FIG. 4. The illumination light sometimes contains an illumination light wave which oscillates on a plane other than the x-y and x-z planes. Actual illumination light contains a plurality of kinds of waves. The intensity distribution of reflected light may change depending on the types of contained waves. Hence, the optical characteristic setting unit 104 sets illumination light having a polarization property corresponding to the measurement accuracy.

Finally, the directionality of light of the optical characteristics will be described. The directionality of light represents the degree of spread of light emitted from the light irradiation unit 103. As the directionality rises, light close to parallel light is obtained.

FIGS. 5A to 5D are views showing reflection corresponding to the directionality of illumination light.

Figure 5A:
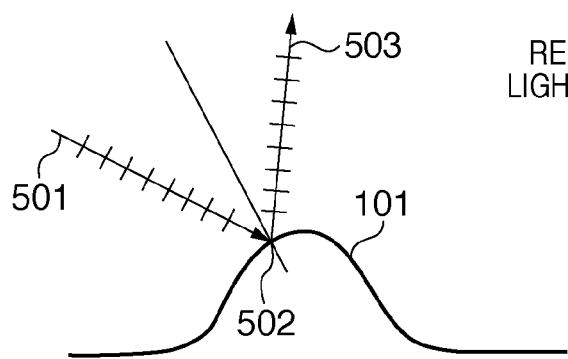
FIGS. 5A to 5D are views showing reflection corresponding to the directionality of illumination light.
Figure 5C:
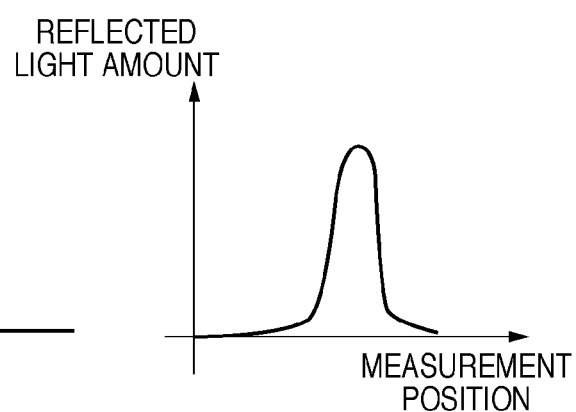

FIG. 5A shows a case in which the measurement target object is irradiated with illumination light with high directionality. Illumination light 501 has high directionality. The illumination light 501 strikes a point 502 on the measurement target object 101. When the directionality of illumination light is high, the illumination light 501 emitted from the light source to the point 502 is hardly diffused in other directions. For this reason, the light amount of the illumination light 501 with which the point 502 is irradiated is large in this direction. The light amount of reflected light 503 in the regular direction is also large. FIG. 5C shows the relationship between the measurement position and the reflected light amount.

Figure 5B:
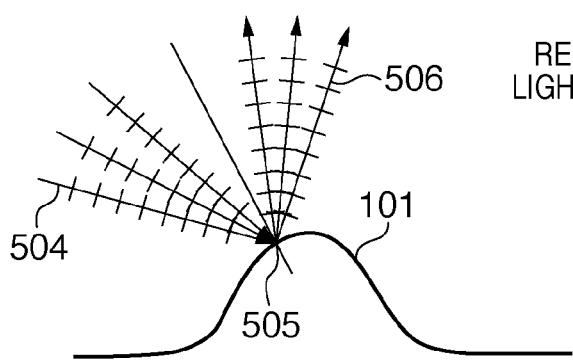
Figure 5D:
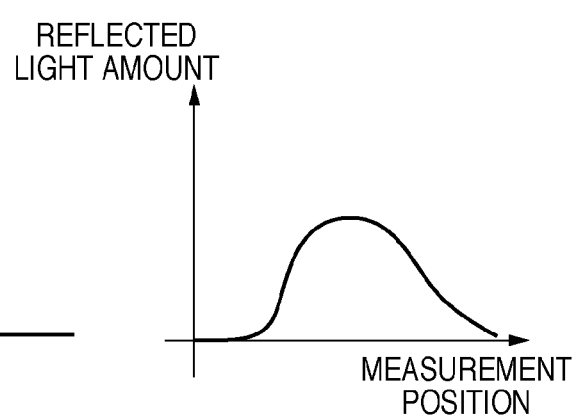

FIG. 5B shows a case in which the measurement target object is irradiated with illumination light with low directionality. Illumination light 504 has low directionality. The illumination light 504 strikes a point 505 on the measurement target object 101. When the directionality of illumination light is low, the illumination light 504 emitted by the light source to the point 505 is diffused in other directions. For this reason, the illumination light 504 with which the point 505 is irradiated contains a large amount of light from other directions, and reflected light 506 is also diffused. FIG. 5D shows the relationship between the measurement position and the reflected light amount. Hence, the optical characteristic setting unit 104 sets illumination light having directionality corresponding to the structure of the measurement target object 101. Optical characteristic setting by the optical characteristic setting unit 104 has been described above.

A reflected light measurement unit 105 measures reflected light from the measurement target object 101. The reflected light measurement unit 105 includes, e.g., an optical sensor for detecting reflected light from the measurement target object 101.

A reflected light extraction unit 106 extracts, from the reflected light measured by the reflected light measurement unit 105, information about reflected light generated by the surface shape of the measurement target object 101 and that about reflected light generated by the scattering characteristic of the microstructure on the surface. The reflected light extraction unit 106 includes, e.g., a GPU (Graphics Processing Unit) and a VRAM (Video RAM). The GPU analyzes the data of reflected light measured by the reflected light measurement unit 105 and stored in the VRAM. As a result of analysis, the reflected light extraction unit 106 extracts reflected light data generated by the surface structure and reflected light data generated by the scattering characteristic. A method of extracting each reflected light data will be described later.

An output unit 107 outputs the extraction result of the reflected light extraction unit 106. The output unit 107 has a monitor to display the extraction result or a printer.

A recording unit 108 records the extraction result of the reflected light extraction unit 106. The recording unit 108 includes a hard disk, flash memory, or the like to record the data of the extraction result.

A control unit 109 controls the operations of the illumination unit 102, reflected light measurement unit 105, reflected light extraction unit 106, output unit 107, and recording unit 108. The control unit 109 includes a CPU, RAM, and ROM which stores various kinds of control programs.

The various kinds of programs stored in the ROM include a control program for controlling illumination light to be emitted by the illumination unit 102, and a control program for controlling the reflected light measurement unit 105.

The various kinds of programs may also include a control program for controlling the reflected light extraction unit 106, a control program for controlling the output unit 107, and a control program for controlling the recording unit 108. The arrangement of the measurement apparatus according to this embodiment has been described above. The arrangement shown in FIG. 1 can partially be replaced with, e.g., a general personal computer.

Figure 6:
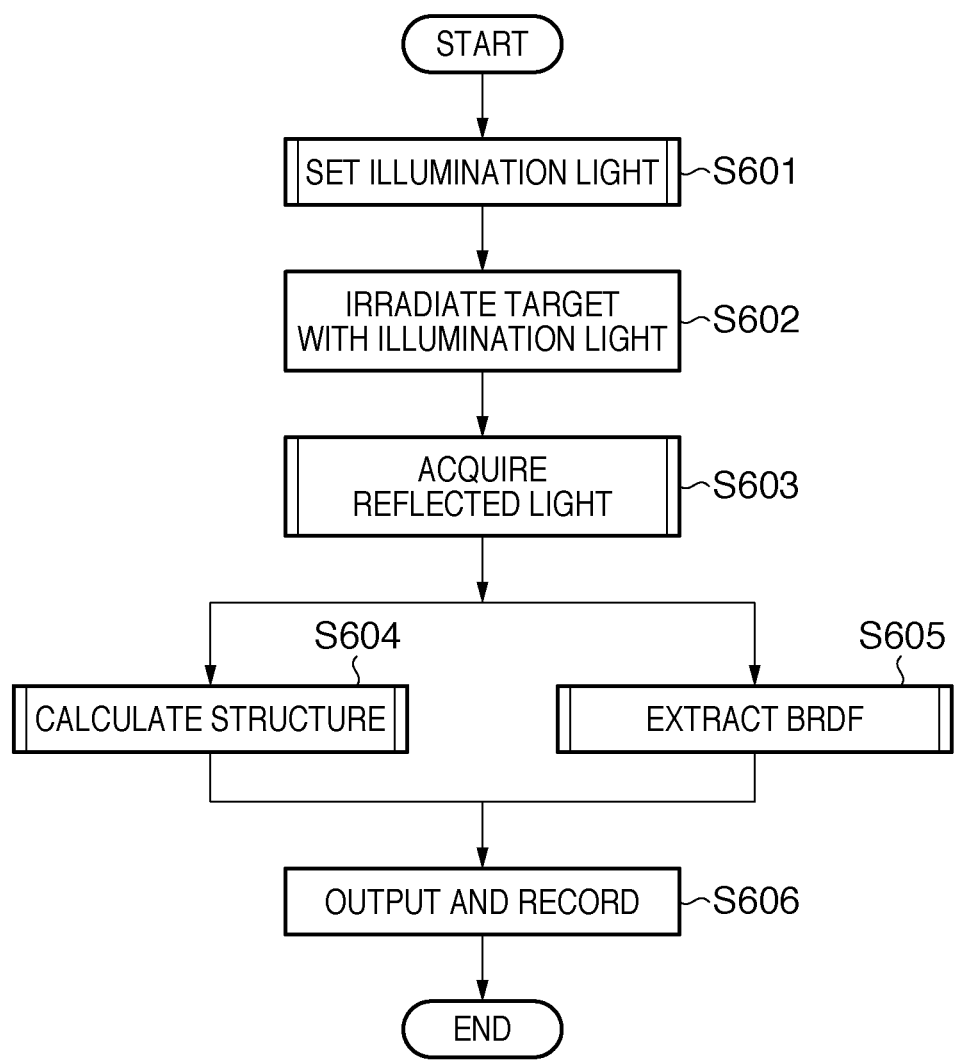
FIG. 6 is a flowchart illustrating the sequence of processing of the measurement apparatus according to the first embodiment.

FIG. 6 is a flowchart illustrating the sequence of processing of the measurement apparatus according to this embodiment. The sequence of processing of this embodiment will be described with reference to FIG. 6.

(Step S601) The control unit 109 functions as an illumination light setting unit, and the illumination unit 102 sets the optical characteristics of illumination light with which the measurement target object 101 should be irradiated. Optical characteristics including the above-described wavelength, polarization property, and directionality of illumination light are set. The optical characteristics are set based on a preset measurement accuracy. For example, to measure the microstructure on the surface of the measurement target object 101, optical characteristics are set to irradiate the measurement target object with illumination light containing many short wavelengths. If a high measurement accuracy is required, the polarization property and directionality of illumination light are set to be high. The optical characteristics of illumination light may appropriately be set based on a user instruction input from an instruction unit (not shown).

(Step S602) The illumination unit 102 irradiates the measurement target object 101 with illumination light. The illumination light with which the measurement target object is irradiated has the optical characteristics set in step S601. The control unit 109 controls the irradiation timing of the illumination unit 102.

(Step S603) The control unit 109 causes the reflected light measurement unit 105 to measure reflected light from the measurement target object 101.

(Step S604) The reflected light extraction unit 106 functions as an extraction unit to extract information about the surface shape of the measurement target object 101. The surface shape of the measurement target object 101 extracted here is a structure of an order of magnitude much larger than the wavelength of the illumination light. A detailed method of extracting the surface shape of the measurement target object 101 will be described later.

(Step S605) The reflected light extraction unit 106 functions as an extraction unit to extract the BRDF of the surface of the measurement target object 101 from the reflected light. A detailed method of extracting the BRDF will be described later.

(Step S606) The output unit 107 outputs and the recording unit 108 records, respectively, the structure of the measurement target object 101 and the BRDF extraction result under the control of the control unit 109. The recording unit 108 stores the structure of the measurement target object 101 and the BRDF extraction result in, e.g., a hard disk or flash memory as digital data. The output unit 107 displays the structure of the measurement target object 101 and the BRDF extraction result on, e.g., a monitor.

(Method of Extracting Surface Shape of Measurement Target Object)

The method of extracting the surface shape of the measurement target object 101 in step S604 will be described below. The data of reflected light is used for extraction.

Figure 7:
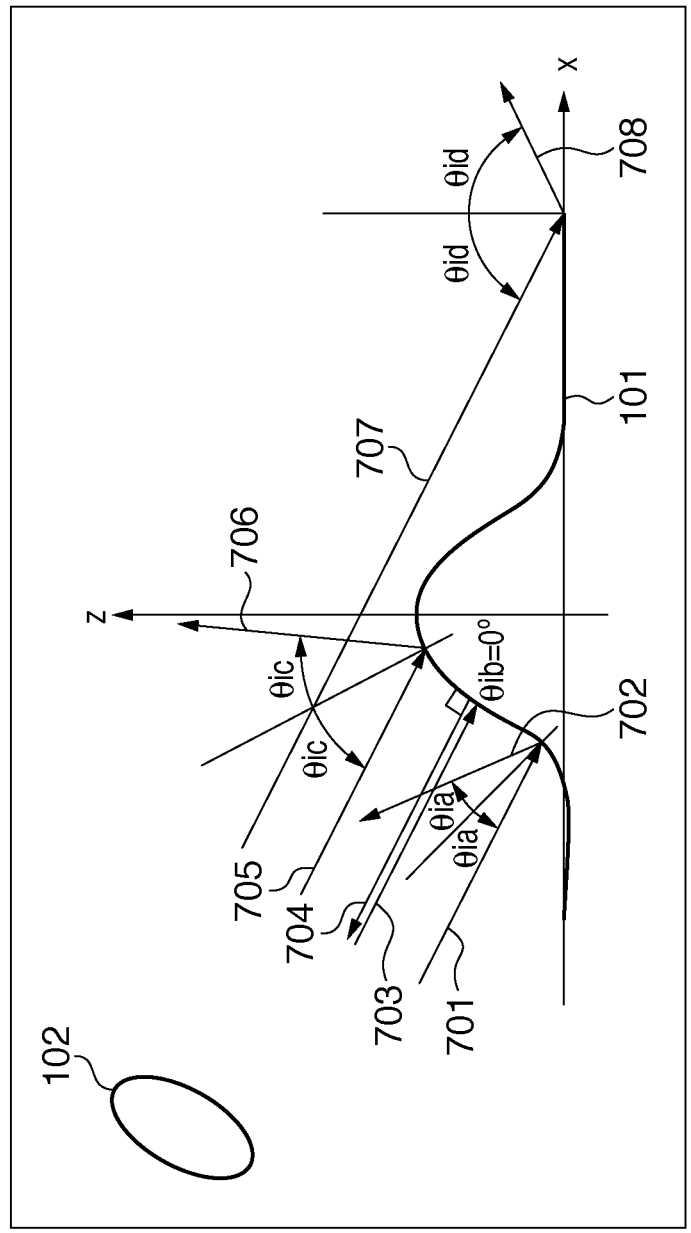
FIG. 7 is a view showing reflected light when a measurement target object is irradiated with illumination light.

FIG. 7 is a view showing reflected light when the measurement target object 101 is irradiated with illumination light.

Illumination light in FIG. 7 is parallel light emitted by the illumination unit 102. Reflected light in FIG. 7 is generated by a structure of an order of magnitude much larger than the wavelength of the illumination light. For example, reflected light corresponding to incident light 701 is reflected light 702. Similarly, reflected light 706 corresponds to incident light 705, and reflected light 708 corresponds to incident light 707.

The incident angle and reflection angle for the incident light 701 are θia. The incident angle and reflection angle for the incident light 703 are θib. The incident angle and reflection angle for the incident light 705 are θic. The incident angle and reflection angle for the incident light 707 are θid. The sum of the incident angle and reflection angle represents the relative angle between the incident light and reflected light. In this embodiment, to calculate the structure of the measurement target object 101, first, the relative angle of illumination light on the measurement target object 101 is calculated. The tilt at each point on the surface of the measurement target object 101 is calculated from the relative angle, thereby calculating the structure of the measurement target object 101.

Figure 8:
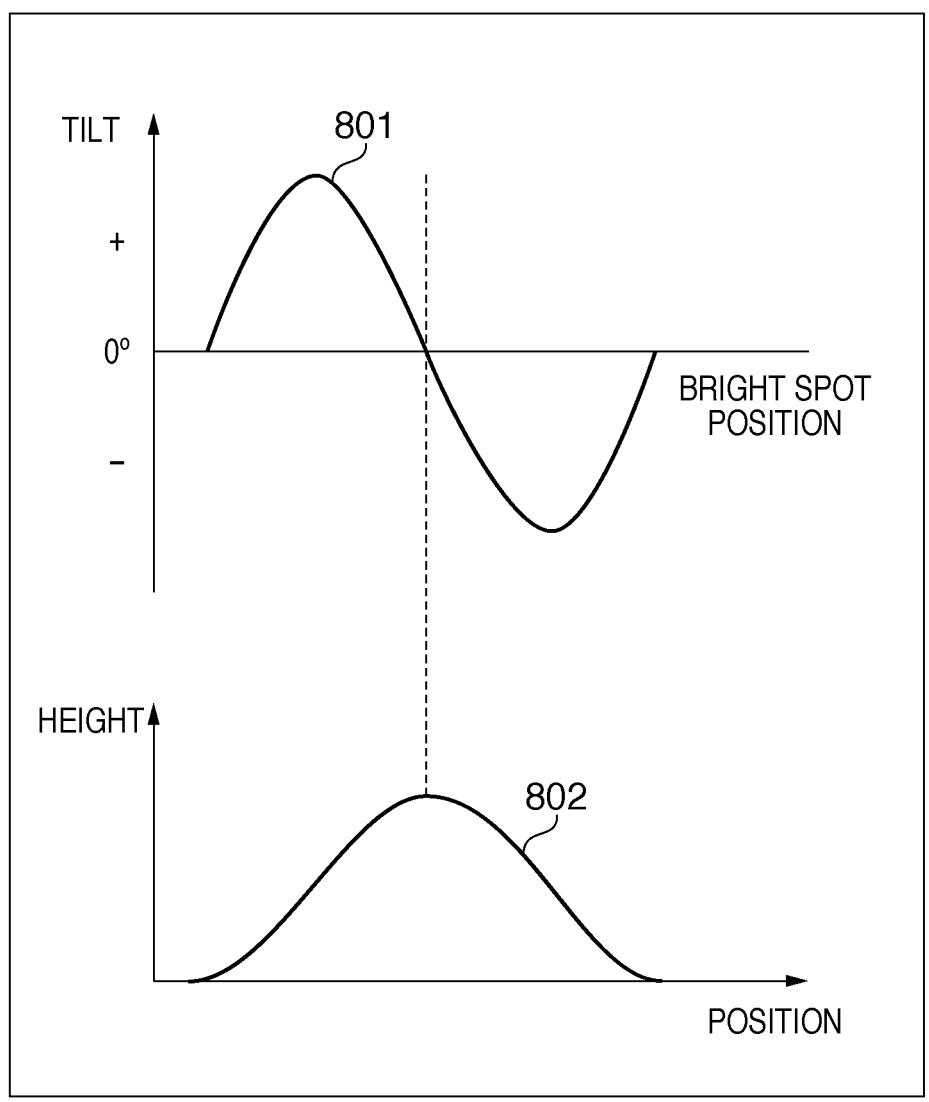
FIG. 8 is a graph showing a method of calculating the structure of the measurement target object based on the tilt of the surface of the measurement target object.

FIG. 8 is a graph showing the method of calculating the structure of the measurement target object 101 based on the tilt at each point on the surface of the measurement target object 101. As is apparent from FIG. 8, when a tilt 801 of the measurement target object 101 has a positive value, a height 802 of the measurement target object 101 is large. When the tilt 801 of the measurement target object 101 has a negative value, the result is the reverse. Using the relationship shown in FIG. 8 makes it possible to calculate the structure of the measurement target object 101 based on the tilt at each point on the surface of the measurement target object 101.

To calculate the relative angle of incident light and reflected light, it is only necessary to know the direction of incident light and the direction of reflected light. As the calculation method, for example, the angle is calculated from the inner product of the direction vector of incident light and that of reflected light. The direction of incident light can be obtained from the position and orientation of the illumination unit 102. A method of calculating the direction of reflected light will be explained next.

Figure 9:
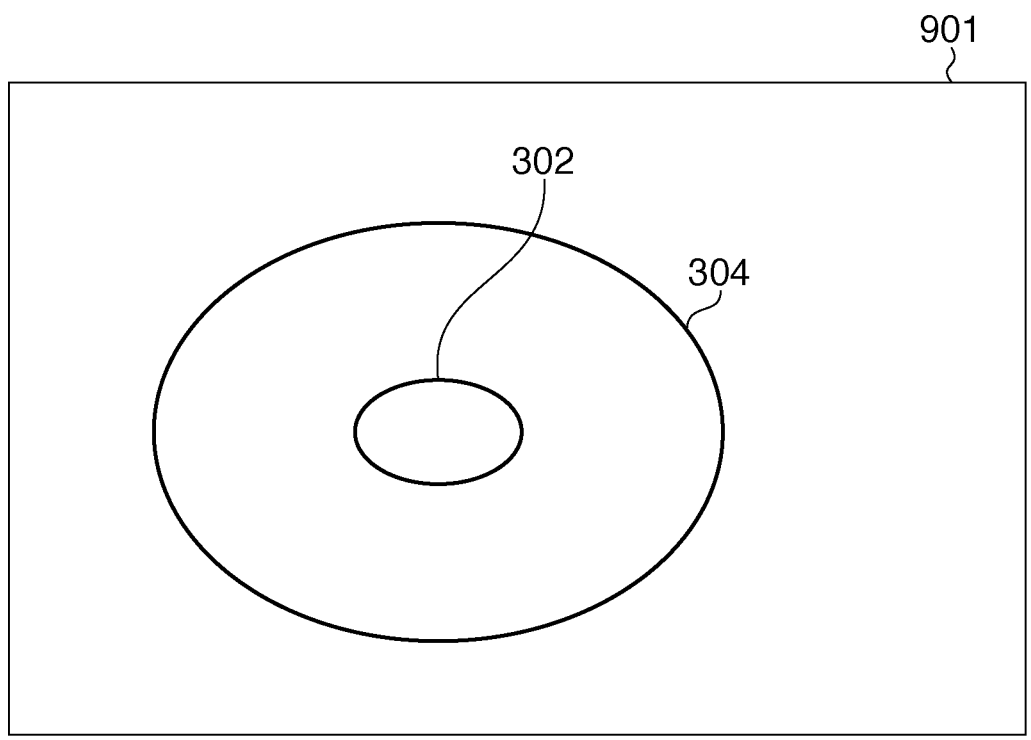
FIG. 9 is a view showing an image sensed by a reflected light measurement unit.

FIG. 9 is a view showing an image sensed by the reflected light measurement unit 105 arranged on the upper side in the z-axis direction in FIG. 7. The reflected light measurement unit 105 has a sufficiently large image sensing surface for the measurement target object 101 and can sense the entire surface of the measurement target object 101 shown in FIG. 7 at once.

Figure 10:
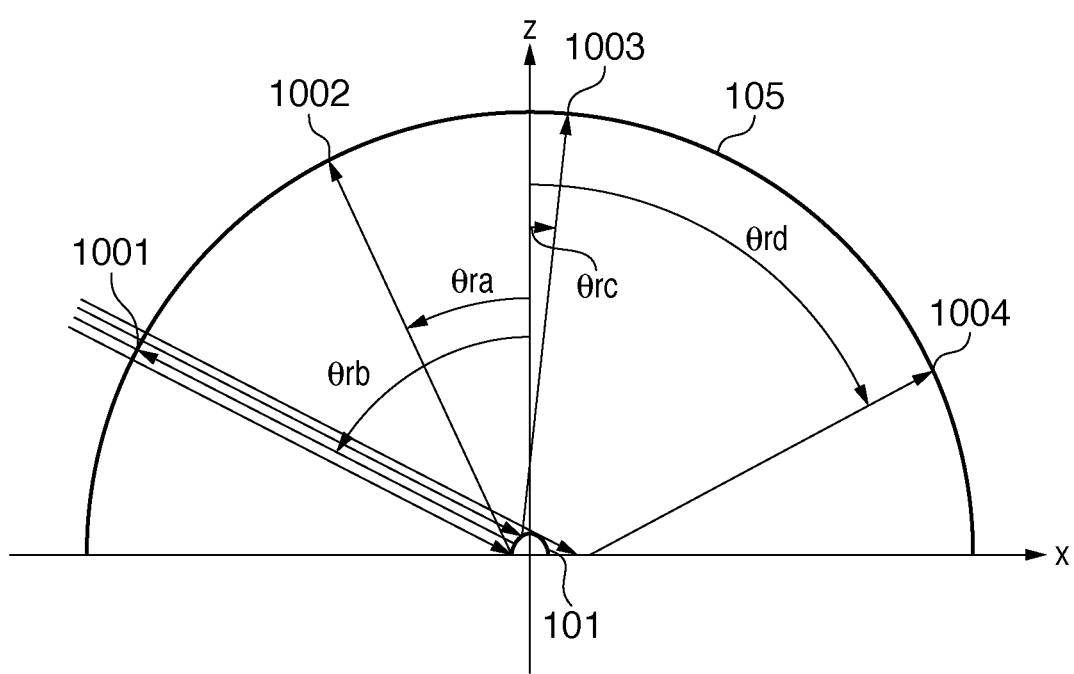
FIG. 10 is a view showing a reflected light measurement unit having a large image sensing surface for the measurement target object.

FIG. 10 is a view showing an example of the reflected light measurement unit 105 having a sufficiently large image sensing surface for the measurement target object 101. As shown in FIG. 10, the reflected light measurement unit 105 having a circular arc shape is arranged for the measurement target object 101, thereby measuring reflected light from each of measurement positions 1001 to 1004. The reflected light contains a geometric-optical component and a wave-optical component.

Figure 11:
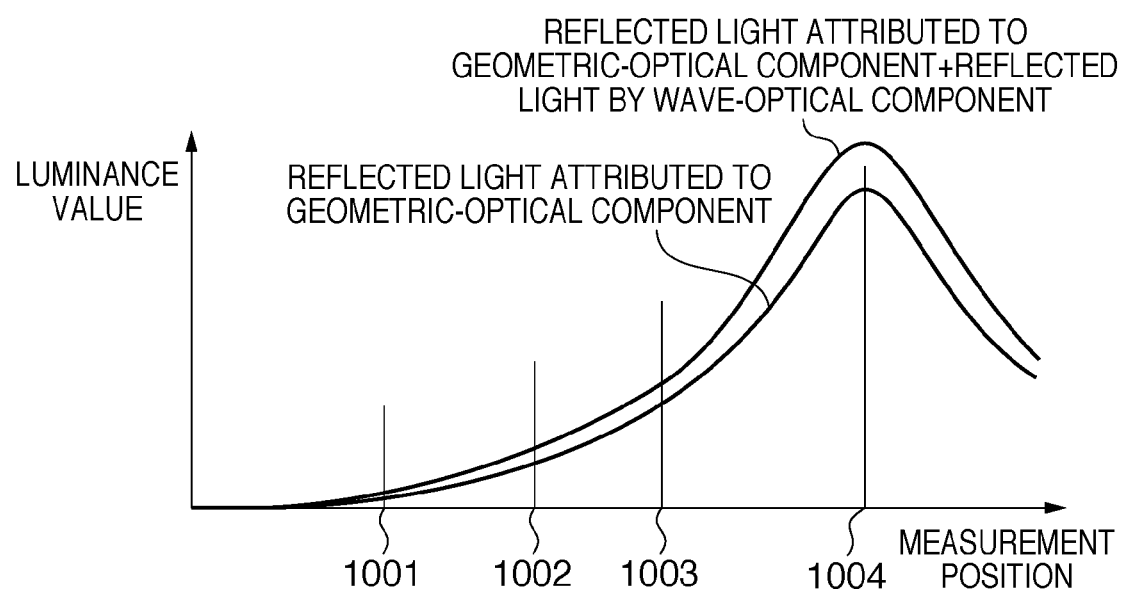
FIG. 11 is a graph showing the ratio of reflected light of a geometric-optical component to reflected light of a wave-optical component.

FIG. 11 is a graph showing the ratio of the geometric-optical component to the wave-optical component contained in the reflected light. As shown in FIG. 11, the geometric-optical component of the reflected light gets more dominant as it gets closer to the measurement position 1004 in the regular reflection direction. In addition, the luminance value increases as it gets closer to the measurement position 1004 in the regular reflection direction.

The position of reflected light 302 attributed to the geometric-optical component on a sensed image 901 is the position where the reflected light measurement unit 105 and the regularly reflected light intersect. It is therefore possible to calculate the direction of reflected light from the position and orientation of the reflected light measurement unit 105 by detecting the position of the reflected light 302 attributed to the geometric-optical component. Various methods are available to extract the position of the reflected light 302 attributed to the geometric-optical component from the sensed image 901. For example, the luminance value distribution in the sensed image 901 is calculated by image processing, and an area having a luminance value equal to or larger than a predetermined value is extracted. The area of regularly reflected light should have higher luminance than in other areas. Hence, an area having a luminance value equal to or larger than a predetermined value can be regarded as the position of the reflected light 302 attributed to the geometric-optical component. The predetermined value used here can be set by experimentally measuring reflected light from the measurement target object 101.

To more accurately calculate the position of the reflected light 302 by the geometric-optical component, the center of gravity of an area having a luminance value equal to or larger than a predetermined value may be calculated. The position of the center of gravity is defined as the position of the reflected light 302. The direction of reflected light can be calculated by calculating the position of the reflected light 302 by the above-described processing.

As another method of calculating the direction of reflected light, the reflected light measurement unit 105 is moved.

In this method, a moving unit (not shown) moves the reflected light measurement unit 105 to a position and orientation at which reflected light with a largest luminance value can be measured. Various methods have been proposed to move the reflected light measurement unit 105 to a position and orientation at which reflected light with a largest luminance value can be measured, and a description thereof will be omitted.

The luminance value should be largest at the position where the regularly reflected light and the reflected light measurement unit 105 intersect. Hence, the position where reflected light having a largest luminance value can be measured is the position where the regularly reflected light and the reflected light measurement unit 105 intersect. The direction of reflected light can be calculated by calculating the position where the regularly reflected light and the reflected light measurement unit 105 intersect, like the above-described method. When moving the position and orientation of the reflected light measurement unit 105, it is unnecessary to make the image sensing surface of the reflected light measurement unit 105 large. An image sensing device such as a general camera is also usable. The method of calculating the structure of the measurement target object according to this embodiment has been described above.

(BRDF Extraction Method)

The method of extracting a BRDF as information about the microstructure in step S605 will be described next. The method will be explained using the sensed image 901 in FIG. 9, as in calculation of the structure of the measurement target object. As is apparent from FIG. 9, reflected light 304 attributed to a wave-optical component appears around the reflected light 302 attributed to the geometric-optical component. The area of the reflected light 304 attributed to the wave-optical component should also have a higher luminance than in other areas, though it is lower than that of the reflected light 302 attributed to the geometric-optical component. It is therefore possible to extract the area attributed to the wave-optical component from the sensed image 901 by extracting an area having a predetermined luminance value or more. The predetermined value used here can be set by experimentally measuring reflected light from the measurement target object 101, like the reflected light 302 attributed to the geometric-optical component. It is possible to calculate the BRDF of the measurement target object 101 based on the extracted area, the incident angle of illumination light, and the position and orientation of the reflected light measurement unit 105. In this embodiment, a BRDF is calculated as a function to express the scattering characteristic of the measurement target object 101. However, any other scattering characteristic may be calculated in accordance with the purpose of measurement.

The above-described BRDF extraction method is also applicable in calculating the direction of reflected light by moving the reflected light measurement unit 105. The area of the wave-optical component can similarly be extracted by extracting an area having a luminance value equal to or larger than a predetermined value on the sensed image of the reflected light measurement unit 105 at a position and orientation at which reflected light with a highest luminance can be measured. The BRDF extraction method according to this embodiment has been described above.

As described above, it is possible to obtain information about the surface shape and the microstructure formed on the surface by irradiating the measurement target object with illumination light having appropriate optical characteristics and measuring reflected light.

As described above, it is also possible to reduce the size of the reflected light measurement unit 105 by performing extraction processing based on difference information between first reflected light at the first relative position of the reflected light measurement unit 105 and second reflected light at the second relative position.

(Second Embodiment)

The second embodiment will be described below with reference to the accompanying drawings. The second embodiment is different from the first embodiment in that feedback control is performed.

Figure 12:
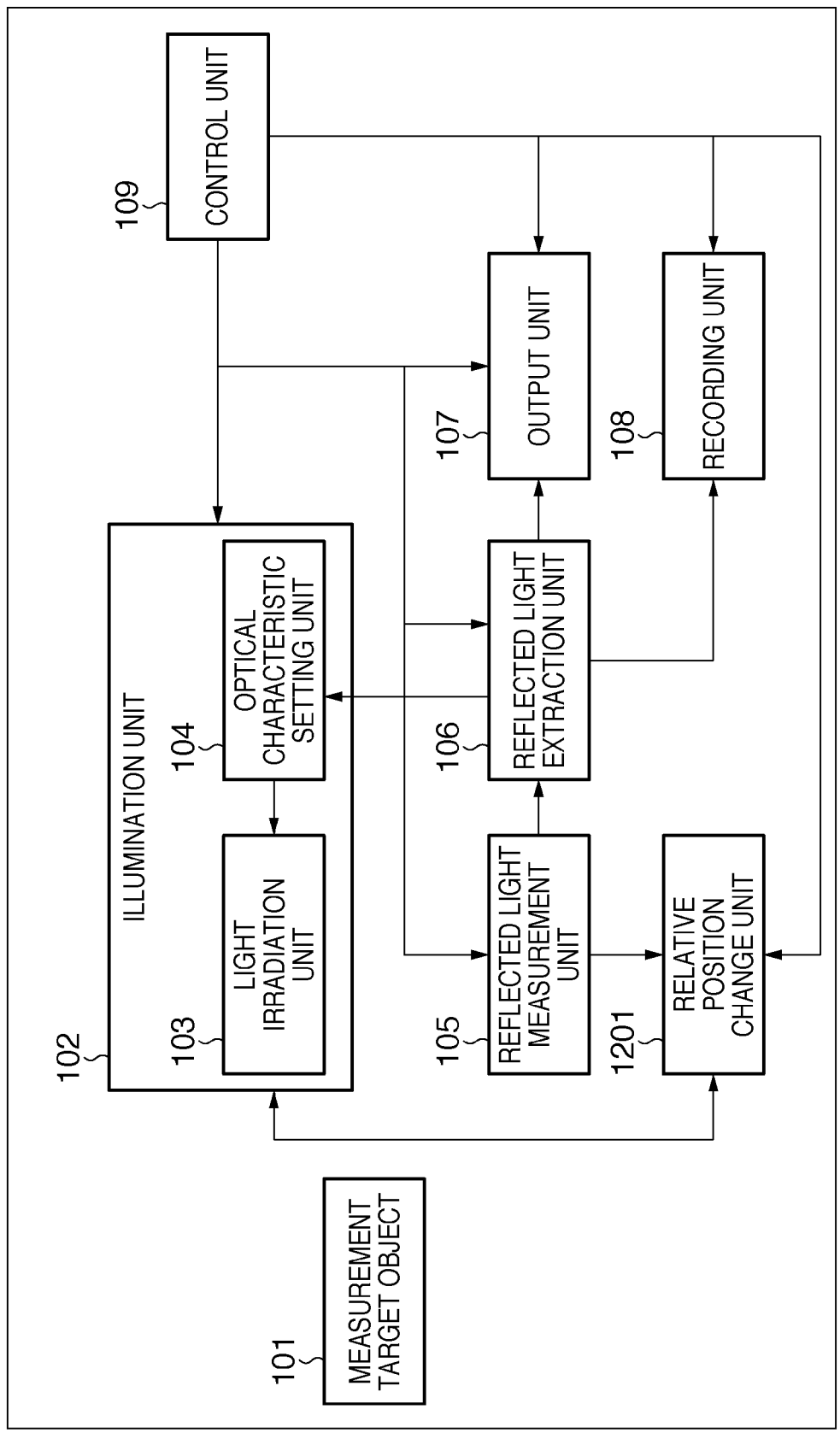
FIG. 12 is a block diagram showing the arrangement of a measurement apparatus according to the second embodiment.

FIG. 12 shows an apparatus according to this embodiment. The apparatus arrangement is almost the same as in FIG. 1 of the first embodiment. Different points will be described below.

A relative position change unit 1201 is a change unit which changes the position of an illumination unit 102 or reflected light measurement unit 105. The relative position change unit 1201 has a driving unit such as a motor and moves the illumination unit 102 or reflected light measurement unit 105.

A control unit 109 is connected to the relative position change unit 1201 to control its driving. The ROM of the control unit 109 also stores a driving program for controlling the driving of the relative position change unit 1201.

A reflected light extraction unit 106 is connected to an optical characteristic setting unit 104 to change its settings in accordance with the extraction result.

The sequence of processing according to this embodiment will be described next.

Figure 13:
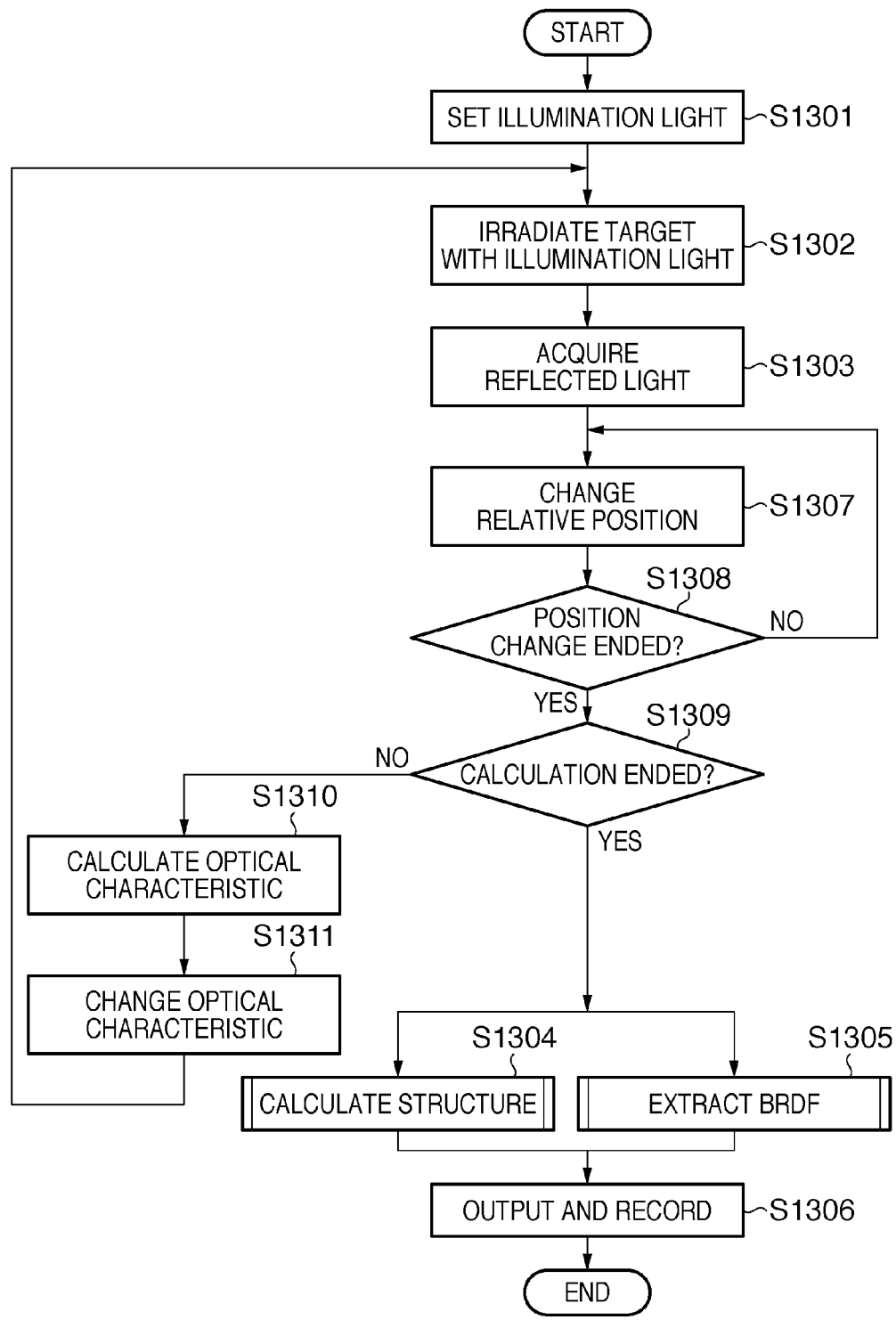
FIG. 13 is a flowchart illustrating the sequence of processing of the measurement apparatus according to the second embodiment.

FIG. 13 illustrates the sequence of processing of this embodiment.

In steps S1301 to S1306, the same processing as in steps S601 to S606 in FIG. 6 of the first embodiment is executed. Processing in steps S1307 to S1311 which is different from the processing of the first embodiment will be described below. (Step S1307) In step S1307, the relative position change unit 1201 changes the relative position of the illumination unit 102 or reflected light measurement unit 105. To calculate the structure of a measurement target object 101, it is necessary to set the reflected light measurement unit 105 and illumination unit 102 to a relative position where regularly reflected light can be measured. Examples of relative position change will be explained below.

Figure 14A:
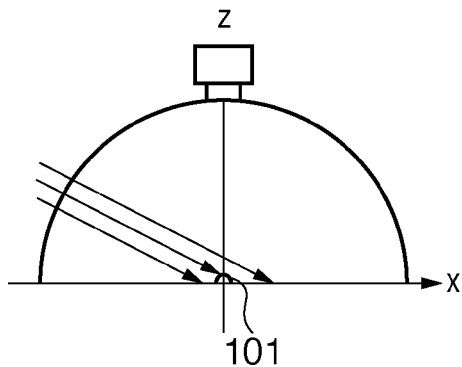
FIGS. 14A to 14E are views showing a case in which the position of an illumination unit is changed while fixing the position of a reflected light measurement unit.
Figure 14B:
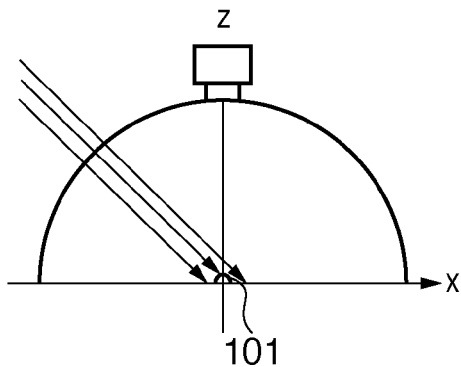
Figure 14C:
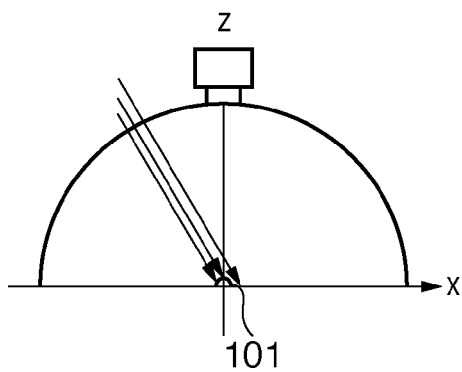
Figure 14D:
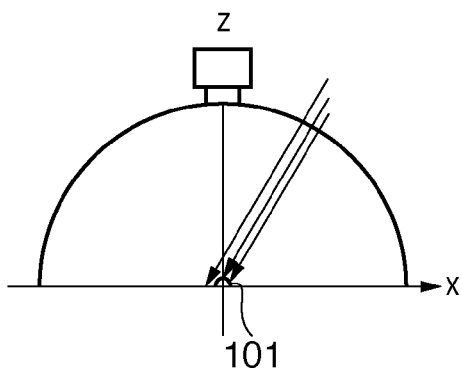
Figure 14E:
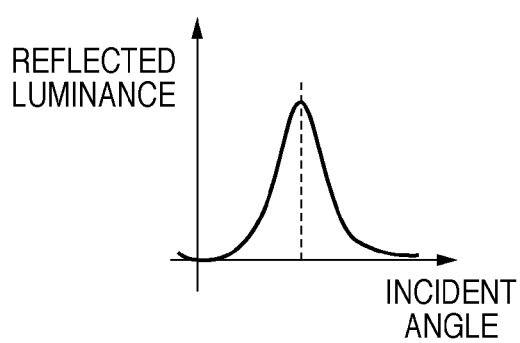

FIGS. 14A to 14E are views showing a case in which the position of the illumination unit 102 is changed while fixing the reflected light measurement unit 105. As shown in FIGS. 14A to 14D, the position of the illumination unit 102 is changed variously, and the reflected light measurement unit 105 measures reflected light. FIG. 14E shows the measurement result. The reflected light measurement unit 105 can be regarded to measure regularly reflected light when the reflected luminance is highest in FIG. 14E. It is therefore possible to set, on the basis of the relationship shown in FIG. 14E, the relative position of the reflected light measurement unit 105 and illumination unit 102 at which regularly reflected light can be measured.

Figure 15:
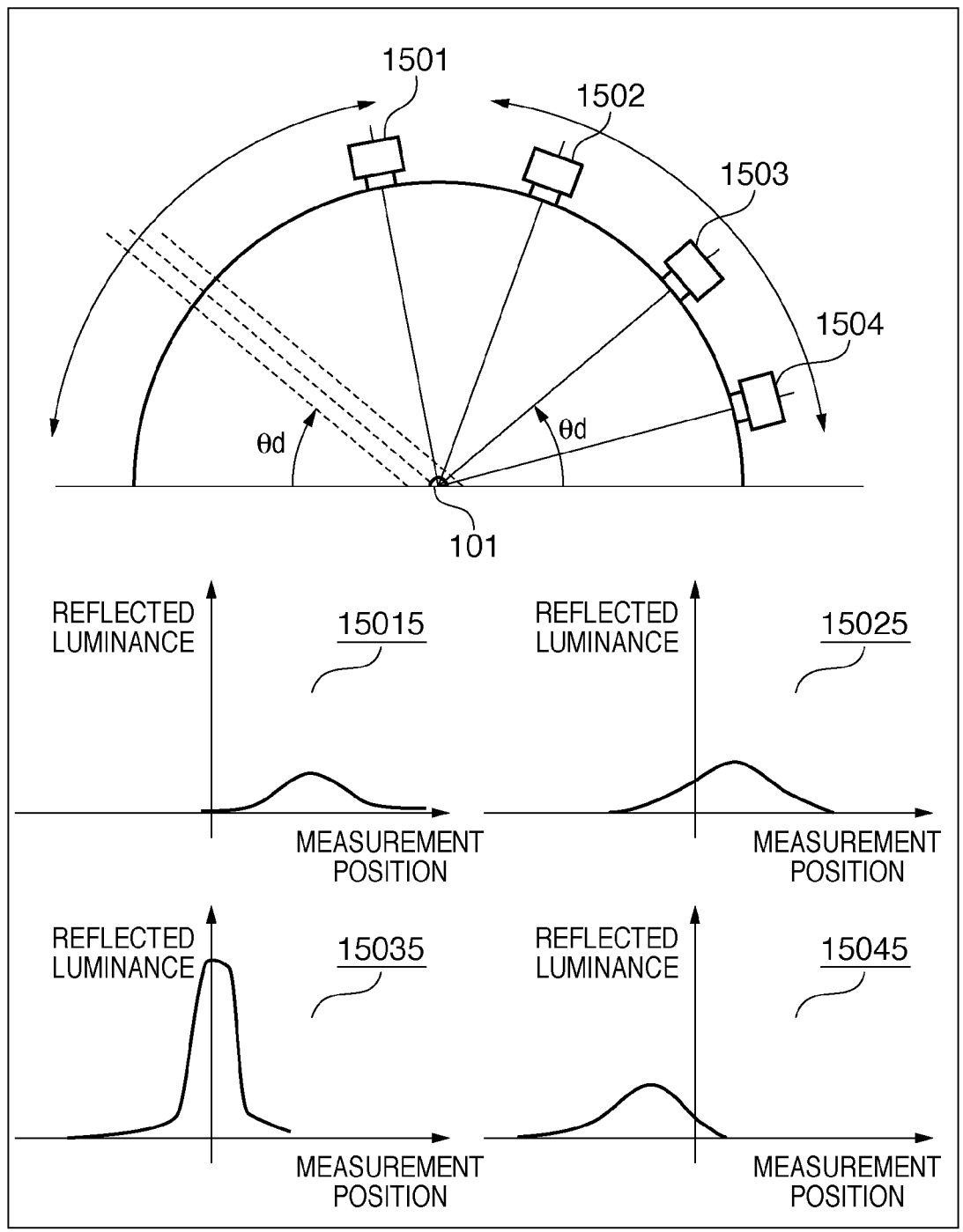
FIG. 15 is a view showing a case in which the position of the reflected light measurement unit is changed while fixing the position of the illumination unit.

FIG. 15 is a view showing a case in which the position of the reflected light measurement unit 105 is changed while fixing the position of the illumination unit 102. As shown on the upper side of FIG. 15, the reflected light measurement unit 105 is moved in a circular arc pattern about the measurement target object 101. Moving the reflected light measurement unit 105 in a circular arc pattern allows to measure reflected light equidistantly from the measurement target object 101 at various angles. It is also possible to increase the measurement accuracy by measuring reflected light equidistantly, as compared to non-equidistant measurement. Each of graphs 15015 to 15045 corresponding to positions 1501 to 1504 shows the correspondence between reflected luminance and the measurement position where reflected light is measured. As described above, if regularly reflected light is measured, the reflected luminance should be high. The relative position at which regularly reflected light is measured can be regarded as the position 1503. Hence, the relative position can be set.

Figure 16:
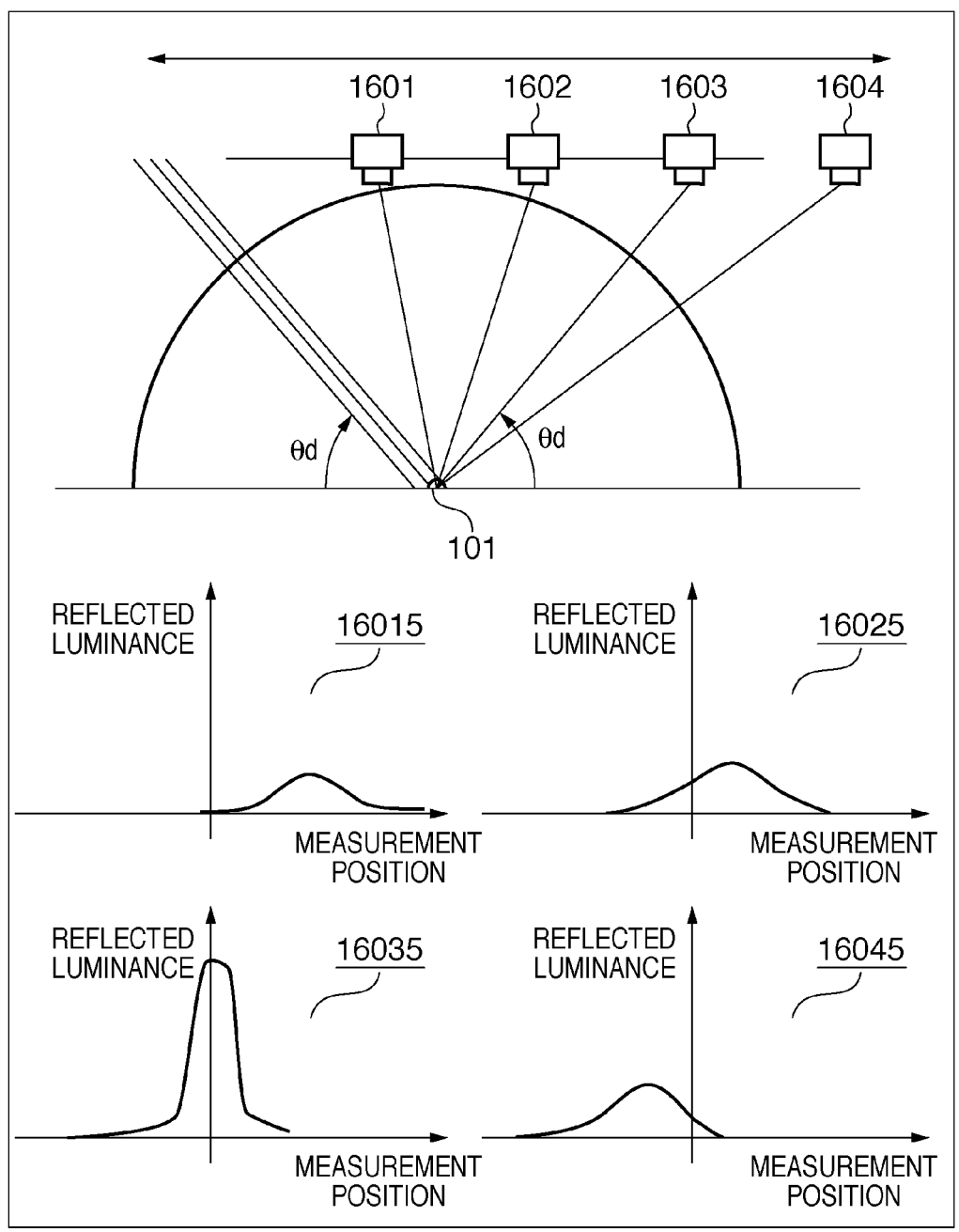
FIG. 16 is a view showing a case in which the position of the reflected light measurement unit is changed while fixing the position of the illumination unit.

FIG. 16 is a view showing a case in which the position of the reflected light measurement unit 105 is changed while fixing the position of the illumination unit 102, as in FIG. 15. In FIG. 16, the reflected light measurement unit 105 is translated with respect to the measurement target object 101, unlike FIG. 15. The translation allows to easily control the relative position change unit 1201 and also simplifies the apparatus arrangement. Each of graphs 16015 to 16045 corresponding to positions 1601 to 1604 shows the correspondence between the relative position and reflected luminance. As in FIG. 15, the relative position 1603 at which the reflected luminance is high can be regarded as the relative position where regularly reflected light is measured. Hence, the relative position can be set.

Examples of changing the relative position of the illumination unit 102 or reflected light measurement unit 105 have been described above. When the relative position is changed, the process advances to step S1308.

(Step S1308) The control unit 109 functions as a position change determination unit to determine whether the relative position of the reflected light measurement unit 105 sufficiently satisfies the measurement reference. As a determination method, for example, if the luminance value measured at the relative position set in step S1307 is equal to or smaller than a predetermined value, the resolution of relative position change by the relative position change unit 1201 is finely reset, and the process returns to step S1308. If the measurement reference is sufficiently satisfied at the relative position set in step S1307, the process advances to step S1309.

(Step S1309) The control unit 109 functions as a determination unit to determine whether the optical characteristics set in step S1301 sufficiently satisfy the measurement reference. The determination can be done based on, e.g., whether the reflected luminance value is equal to or larger than a predetermined value. The directionality as one of the optical characteristics will be described here as an example.

Figure 17:
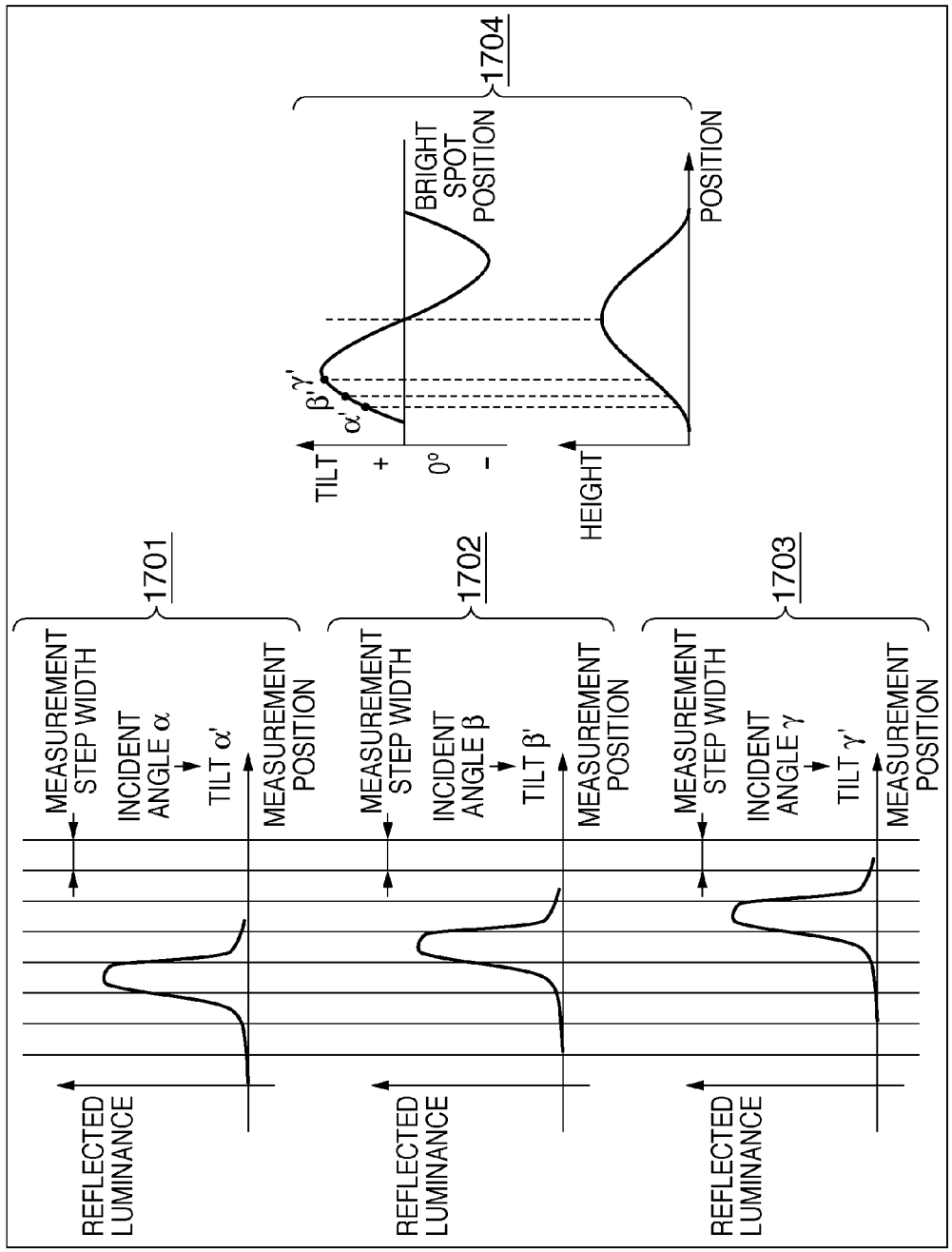
FIG. 17 is a view showing a measurement result by illumination light with directionality which satisfies a measurement reference.

FIG. 17 is a view showing a measurement result by illumination light with directionality which satisfies the measurement reference.

As is apparent from 1701, 1702, and 1703, when illumination light has a sufficiently high directionality, and the illumination unit 102 and reflected light measurement unit 105 are set at a relative position where regularly reflected light can be measured, the reflected luminance is high. It is therefore possible to accurately calculate the structure of the measurement target object 101 using a graph 1704 based on the relative position between the illumination unit 102 and the reflected light measurement unit 105, like the method shown in FIG. 8 of the first embodiment.

Figure 18:
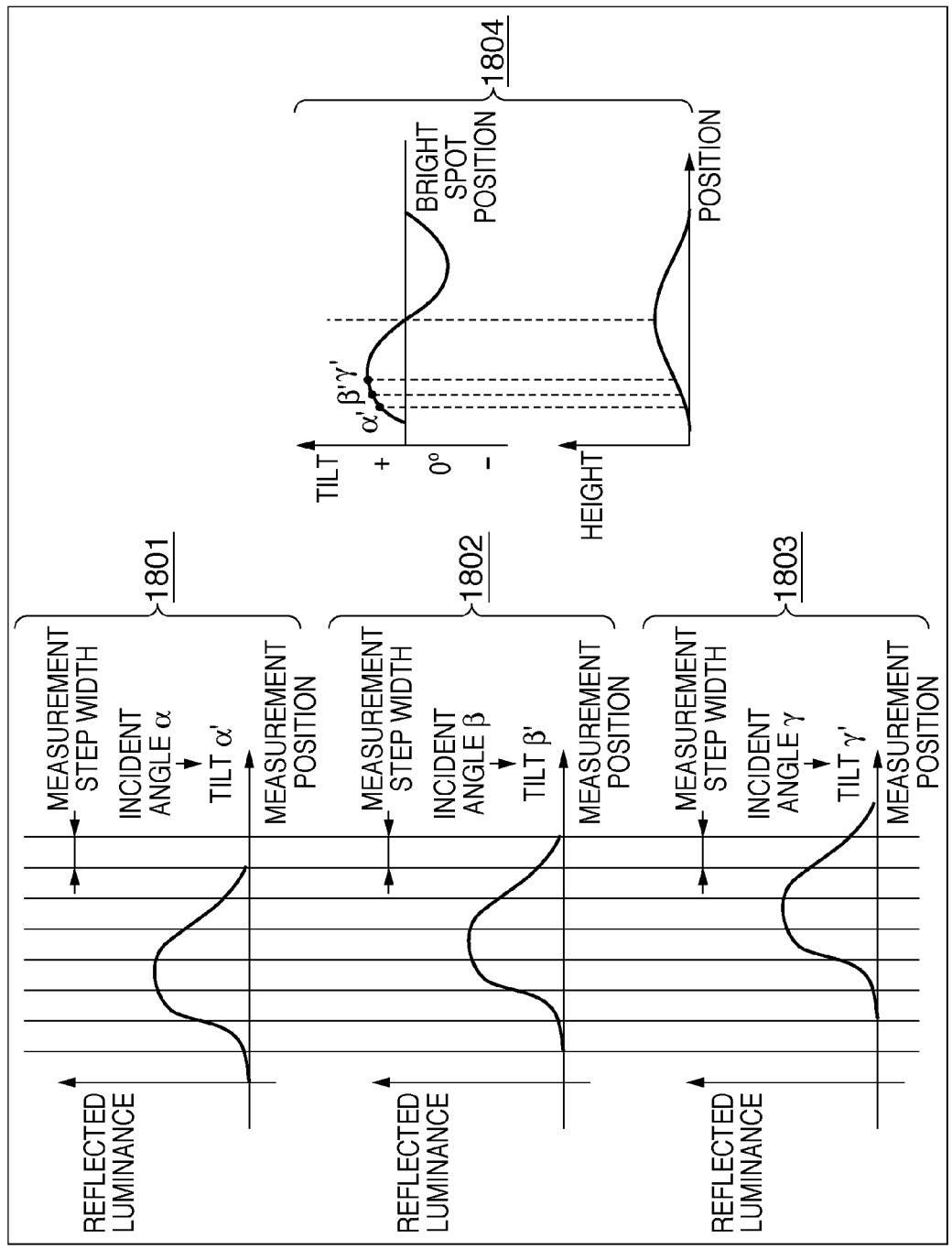
FIG. 18 is a view showing a measurement result by illumination light with directionality which does not satisfy a measurement reference.

FIG. 18 is a view showing a measurement result by illumination light with directionality which does not satisfy the measurement reference. As is apparent from 1801 to 1803, if illumination light has no sufficiently high directionality, the reflected luminance is not so high even when the illumination unit 102 and reflected light measurement unit 105 are set at a relative position where regularly reflected light can be measured. Hence, it is not possible to accurately calculate the structure of the measurement target object 101 as indicated by 1804.

As is apparent from FIGS. 17 and 18, it can be determined whether optical characteristic settings are sufficient by determining whether the reflected luminance value is equal to or larger than a predetermined value.

If it is determined by the above processing that the optical characteristic settings are not sufficient, the process advances to step S1310. If it is determined that the optical characteristic settings are sufficient, the process advances to steps S1304 and S1305.

(Step S1310) The reflected light extraction unit 106 or control unit 109 functions as an optical characteristic calculation unit to calculate optical characteristics to be set. For example, if the reflected luminance value calculated in step S1309 is low, the directionality as one of the optical characteristics is raised.

(Step S1311) The reflected light extraction unit 106 or control unit 109 functions as an optical characteristic change unit to change the optical characteristics set by the optical characteristic setting unit 104. After the change, the process returns to step S1302.

The sequence of processing according to this embodiment has been described above. As described above, feedback processing is performed in steps S1307 and S1308 and in steps S1309 to S1311, thereby automatically and accurately calculating the structure and scattering characteristic of the measurement target object 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-218382 filed Aug. 24, 2007, which is hereby incorporated by reference herein in its entirety.

The invention claimed is:

1. A measurement apparatus comprising:
    an illumination light setting unit which sets a wavelength of a single illumination light so as to be capable of measuring, by using the single illumination light, both a microstructure which is formed on a surface of a measurement target and a surface shape of the measurement target;
    a measurement unit which measures reflected light when the measurement target is irradiated with the single illumination light having the wavelength; and
    an extraction unit which extracts, from the measured reflected light, information about the surface shape of the measurement target and the microstructure formed on the surface.

2. The apparatus according to claim 1,
    wherein said illumination light setting unit sets, in addition to the wavelength, a polarization property and directionality of the illumination light for the purpose of measuring the microstructure and the surface shape.

3. The apparatus according to claim 1, further comprising a relative position change unit which changes a relative position between the illumination light and the measurement target.

4. The apparatus according to claim 3, wherein
    said relative position change unit changes the relative position between the illumination light and the measurement target from a first relative position to a second relative position, and
    said extraction unit extracts the information about the surface shape of the measurement target from difference information between reflected light at the first relative position and reflected light at the second relative position.

5. The apparatus according to claim 1, wherein said illumination light setting unit sets an optical characteristic of the illumination light based on a user instruction.

6. The apparatus according to claim 5, further comprising an optical characteristic change unit which changes the optical characteristic of the illumination light on the basis of the measured reflected light.

7. A measurement apparatus comprising:
    an illumination light setting unit which sets a wavelength of a single illumination light so as to be capable of measuring, by using the single illumination light, both a measurement request of a measurement target and a surface shape of the measurement target;
    a measurement unit which measures first reflected light when a relative position between the illumination light and the measurement target is a first relative position, and the measurement target is irradiated with the single illumination light having the wavelength, and measures second reflected light when the relative position between the illumination light and the measurement target is a second relative position, and the measurement target is irradiated with the illumination light having the wavelength; and
    an extraction unit which extracts, from the measured first reflected light and second reflected light, information about the surface shape of the measurement target and a microstructure formed on the surface.

8. A measurement method comprising:
    using an illumination light setting unit in an illumination light setting step to set a wavelength of a single illumination light so as to be capable of measuring, by using the single illumination light both, a microstructure which is formed on a surface of a measurement target and a surface shape of the measurement target;
    using a measurement unit in a measurement step to measure reflected light when the measurement target is irradiated with the single illumination light having the wavelength; and using an extraction unit in an extraction step to extract, from the measured reflected light, information about the surface shape of the measurement target and the microstructure formed on the surface.

9. A non-transitory computer-readable storage medium storing a program to perform a measurement method, comprising:
using an illumination light setting unit to set a wavelength of a single illumination light so as to be capable of measuring, by using the single illumination light both, a microstructure which is formed on a surface of a measurement target and a surface shape of the measurement target;
using a measurement unit to measure reflected light when the measurement target is irradiated with the single illumination light having the wavelength; and
using an extraction unit to extract, from the measured reflected light, information about the surface shape of the measurement target and the microstructure formed on the surface.

* * * * *